United States Patent
Sakai et al.

(10) Patent No.: US 11,193,762 B2
(45) Date of Patent: Dec. 7, 2021

(54) ROTARY TABLE AND ROUNDNESS MEASURING APPARATUS

(71) Applicant: MITUTOYO CORPORATION, Kanagawa (JP)

(72) Inventors: Hisayoshi Sakai, Kanagawa (JP); Junsuke Yasuno, Hiroshima (JP); Ryosuke Watanabe, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 454 days.

(21) Appl. No.: 16/380,335

(22) Filed: Apr. 10, 2019

(65) Prior Publication Data
US 2019/0323834 A1 Oct. 24, 2019

(30) Foreign Application Priority Data

Apr. 19, 2018 (JP) .............................. JP2018-080478

(51) Int. Cl.
*G01B 21/30* (2006.01)
*G01B 21/20* (2006.01)
(Continued)

(52) U.S. Cl.
CPC .............. *G01B 21/30* (2013.01); *B23Q 1/64* (2013.01); *G01B 21/20* (2013.01); *G12B 5/00* (2013.01);
(Continued)

(58) Field of Classification Search
CPC ........ G01B 21/30; G01B 21/20; G01B 5/201; G01B 5/0004; B23Q 1/64; G12B 5/00; G05B 2219/37194; G05B 2219/37197
See application file for complete search history.

(56) References Cited

U.S. PATENT DOCUMENTS 4,690,254 A * 9/1987 Couvez ............... F16D 55/2262
188/73.36
5,330,157 A * 7/1994 Dern ......................... F16K 1/24
251/162
(Continued)

FOREIGN PATENT DOCUMENTS

CN 105683562 B * 3/2018 ............... F03D 3/02
GB 2280490 A * 2/1995 ............... F16K 1/24
(Continued)

OTHER PUBLICATIONS

Daniel C. Ludois, Aerodynamic Fluid Bearings for Translational and Rotating Capacitors in Noncontact Capacitive Power Transfer System, IEEE Transactions on Industry Applications, vol. 50, No. 2, Mar./Apr. 2014, 9 pages (Year: 2014).*

*Primary Examiner* — Tung S Lau
(74) *Attorney, Agent, or Firm* — Greenblum & Bernstein P.L.C.

(57) ABSTRACT

A rotary disk rotatable around a vertical rotation axis; a bearing supporting the rotary disk so as to be freely rotatable; a slide disk slidable on a top surface of the rotary disk; a position adjustment bracket that displaces the slide disk along the top surface of the rotary disk; a placement disk that is supported by the slide disk; a plurality of air nozzles that are arranged on a top surface of the stator in an annular shape centered on the rotation axis, and form a static pressure air film between the top surface of the stator and a bottom surface of the rotary disk; an aerostatic pocket formed between the top surface of the rotary disk and a bottom surface of the slide disk; and a communication aperture is formed on the rotary disk and introduces pressure of the static pressure air film into the aerostatic pocket.

12 Claims, 6 Drawing Sheets

(51) Int. Cl.
*B23Q 1/64* (2006.01)
*G12B 5/00* (2006.01)

(52) U.S. Cl.
CPC .............. *G05B 2219/37194* (2013.01); *G05B 2219/37197* (2013.01)

(56) References Cited

U.S. PATENT DOCUMENTS

| | | | | |
|---|---|---|---|---|
| 5,947,607 A | * | 9/1999 | Lee | G11B 19/2009 |
| | | | | 384/107 |
| 2014/0371036 A1 | * | 12/2014 | Ellis | A63B 21/4033 |
| | | | | 482/66 |

FOREIGN PATENT DOCUMENTS

| | | | | | |
|---|---|---|---|---|---|
| JP | H08-10722 | A | * | 1/1996 | ............... B08B 5/02 |
| JP | 2569390 | B2 | | 1/1997 | |
| JP | 2628122 | B2 | | 7/1997 | |
| JP | 2000-72228 | A | * | 3/2000 | ............. B65G 43/00 |
| JP | 2000-191129 | A | * | 7/2000 | ............. B65G 47/14 |
| JP | 3131582 | B2 | * | 2/2001 | ............. B65G 43/00 |
| JP | 3174033 | B2 | * | 6/2001 | ............. B65G 47/14 |
| JP | 2003-190895 | A | * | 7/2003 | ............... B08B 5/02 |
| JP | 4053140 | B2 | * | 2/2008 | ............... B08B 1/02 |

\* cited by examiner

ROTARY TABLE AND ROUNDNESS MEASURING APPARATUS

CROSS-REFERENCE TO RELATED APPLICATIONS

The present application claims priority under 35 U.S.C. § 119 of Japanese Application No. 2018-080478, filed on Apr. 19, 2018, the disclosure of which is expressly incorporated by reference herein in its entirety.

BACKGROUND OF THE INVENTION

1. Field of the Invention

The present invention relates to a rotary table and a roundness measuring apparatus.

2. Description of Related Art

The roundness measuring apparatus measures roundness, cylindricity, degree of coaxiality, and the like of a measured object (work piece) having a shape with rotational symmetry such as a circular column and a cylindrical tube. Therefore, the roundness measuring apparatus measures a circumferential shape of the work piece by mounting the work piece on the rotary table, a stylus head of a displacement sensor making contact on a surface of the work piece, and detecting simultaneously displacement of the stylus head and a rotation angle of the rotary table while rotating the rotary table.

In the roundness measuring apparatus, a displacement stroke of the stylus head of the displacement sensor mechanically has a movement range of around 1 mm, however, an electrical measurement range is determined from a dynamic range specific to the displacement sensor which is a ratio with a displacement resolution. In a measurement where a high resolution (high magnification power) is required, the electrical measurement range must be kept small. For example, when there is a centering offset (displacement of an intersecting direction of respective axes) between an axial center of the measured object and a rotation axis of the rotary table during measurement, a detection device is required to have a greater stroke (that is at least two times the amount of centering offset). In other words, with respect to a roundness value that the work piece has, the electric measurement range is occupied more than necessary and as a result, the resolution cannot be increased. Given this, when the measurement is performed with the high resolution, a centering table is arranged on the rotary table and a centering work is performed to minimize an amount of centering offset (centering adjustment) (Japanese Patent Nos. 2569390 and 2628122).

The centering table includes a slide disk that is capable of displacement along a top surface of a main body of the rotary table and a placement disk that is supported by the slide disk. In the slide disk or the placement disk, a position adjustment mechanism, as a centering mechanism, similar to a micrometer head is arranged in two directions that are horizontal and orthogonal to each other. Each position adjustment mechanism is in contact with the rotation axis of the rotary table. Therefore, when the position adjustment mechanism is operated, the slide disk or the placement disk can be finely displaced in two directions horizontal to the rotary table (Cx direction and Cy direction of the main body of the rotary table). Accordingly, the rotation axial center of the rotary table main body and the rotation axial center of the work piece (placement disk) are finely displaced in the horizontal direction and the centering adjustment to minimize the amount of centering offset can be performed.

In the roundness measuring apparatus described in Japanese Patent Nos. 2569390 and 2628122, automation of the centering adjustment is enhanced to increase efficiency of the centering work. In the centering adjustment, a shape of the work piece is measured by the detection device and the amount of centering offset of the rotary table is detected. Based on the detected amount of centering offset, the centering mechanism of a motor drive type is activated and the placement disk and the rotary table main body are relatively displaced horizontally. Specifically, the resolution for shape measurement of the work piece is first roughly set, scanning measurement is performed on a circumference of the measured object in a state where the electric measurement range is broad, and the amount of centering offset is found from the relative position between the axial center of the work piece and the rotation axis of the rotary table main body. Then, the work piece is displaced until the detected amount of centering offset reaches a state where the amount is not deviated the electrical measurement range necessary for the high resolution measurement, and accordingly the centering adjustment is performed. After performing such a centering adjustment, an original roundness measurement is performed. The roundness measuring apparatus described in Japanese Patent Nos. 2569390 and 2628122 is also provided with, in addition to the centering adjustment noted above (horizontal alignment of the axial center), a function to correct inclination of the axial center of the work piece (leveling adjustment) with respect to the rotation axis of the rotary table. While the centering adjustment is performed by a relative displacement along a horizontal surface, the leveling adjustment is performed by the relative displacement along a spherical surface (centered on the rotation axial center of the rotary table) for example.

In the centering table described above, between the rotary table main body and the slide disk, a guide mechanism is used to displace the rotary table main body and the slide disk in two directions horizontally. As such a guide mechanism, a rolling guide mechanism or a sliding guide mechanism is used. In the rolling guide mechanism, for example, a rolling element such as a ball is interposed between the top surface of the rotary table main body and a bottom surface of the slide disk to reduce frictional resistance during the relative displacement. In the sliding guide mechanism, a sliding member is arranged on the bottom surface of the slide disk and the member slides on the top surface of the rotary table main body, for example. In this case, lubricating oil is supplied to a sliding surface of the sliding member in order to form a mixed lubrication state to reduce the frictional resistance during the relative displacement.

In recent years, there has been a great demand for high load bearing of the rotary table and high speed of rotation. In the rotary table having the centering table noted above, disturbances such as vibration from a rotation drive mechanism and influence of inertial force of the measured object are growing. In such a situation, the centering table provided to the rotary table leads to the following challenges. For example, the centering table that uses the rolling guide mechanism has about 0.002 to 0.003 of coefficient of friction (rolling friction). The centering table supported by the rolling guide can obtain a favorable sliding performance even at the time of the centering adjustment. On the other hand, the centering table is easily influenced by driving vibration from the rotation drive mechanism (a motor or an engaged portion of a toothed belt) or the disturbances such as centrifugal force in conjunction with the rotation. However, the centering table that uses the sliding guide mechanism has about 0.1 to 0.15 of coefficient of friction, which is approximately 50 times of the coefficient of friction of the rolling guide mechanism, has an excellent damping performance of vibration, and is hardly influenced by the disturbances. On the other hand, when a work piece having a large weight is placed according to the demand of high load bearing, sliding resistance at the time of the centering adjustment becomes greater and deformation and distortion are easily generated due to overload and internal stress toward a centering mechanism (position adjustment mechanism).

SUMMARY OF THE INVENTION

The present invention provides a roundness measuring apparatus and a rotary table that enables a high damping performance during measurement and to reduce sliding resistance at the time of a centering adjustment.

The rotary table of the present invention includes a rotary disk that can rotate around a vertical rotation axis; a bearing member that supports the rotary disk so as to be freely rotatable; a slide disk that can slide on a top surface of the rotary disk; a position adjustment mechanism that displaces the slide disk along the top surface of the rotary disk; a placement disk that is supported by the slide disk; a plurality of air nozzles that are arranged on a top surface of the bearing member in an annular shape centered on the rotation axis and forms a static pressure air film between the top surface of the bearing member and a bottom surface of the rotary disk; an aerostatic pocket that is formed between the top surface of the rotary disk and the bottom surface of the slide disk; and a communication hole that is formed on the rotary disk and introduces pressure of the static pressure air film into the aerostatic pocket.

In the present invention, the rotary disk and the bearing member correspond to a basic configuration of the rotary table. The rotary disk is supported in a non-contact state by the static pressure air film that is formed between the rotary disk and the bearing member and a smooth rotation can be obtained as a rotary table. The slide disk that is provided on the top surface of the rotary disk, position adjustment mechanism, and the placement disk correspond to a centering table. In the centering table, a portion of a work piece weight placed on the slide disk or the placement disk, and the placement disk is supported in the non-contact state by air pressure inside the aerostatic pocket and can perform a smooth displacement by reducing the sliding resistance caused by a relative displacement at a contact surface when performing the centering adjustment that displaces with respect to the rotary disk by the position adjustment mechanism. Further, during measurement, the static pressure air film has rigidity and an equalization effect, so that high geometric motion accuracy can be obtained. In addition, since the contact frictional force that is restricted by the pressure inside of the pocket exerts the damping effect of vibration, it is possible to reduce the influence of the disturbance without adding an excess load to the position adjustment mechanism. At this time, the air pressure inside the aerostatic pocket can be obtained via the communication hole from the static pressure air film between the rotary disk and the bearing member, and can have a simple apparatus configuration without requiring a separate air pipe and the like.

In the rotary table of the present invention, the communication hole is preferably arranged in the annular shape having a similar diameter as the plurality of air nozzles arranged in an annular shape. In the present invention, pressurized air that is supplied from the air nozzles to an annular groove and the static pressure air film is communicated with the communication hole using a shortest path, and therefore the air pressure can be transmitted efficiently through the communication hole into the aerostatic pocket.

In the rotary table of the present invention, the rotary table is formed preferably with at least one of the annular groove that is formed on the top surface of the bearing member and communicated through the plurality of air nozzles, or the annular groove that is formed on the bottom surface of the slide disk and communicated through a plurality of the communication holes. In the present invention, the communication hole or the air nozzle is communicated with the respective annular groove at all times and even in a case where the communication hole and the air nozzle are separated according to an angle of rotation, the pressure of the static pressure air film can be introduced stably into the aerostatic pocket.

In the rotary table of the present invention, the aerostatic pocket is preferably be surrounded by a sliding seal that is fixated to the top surface of the rotary disk or the bottom surface of the slide disk. In the present invention, the pressurized air introduced to the aerostatic pocket is maintained internally by being surrounded by the sliding seal, and therefore, there is no leak of pressurized air or the leak is suppressed to an extremely small amount, so an amount of consumed air can be reduced as the entire rotary table.

In the present invention, the sliding seal is preferably formed by a low friction material sheet such as fluorine resin. For example, two sliding seals in different sizes (big and small) are installed in two layers internally and externally, and an annular region therebetween may be configured as the aerostatic pocket. Alternatively, a plurality of sliding seals in a small diameter that serve as the aerostatic pocket inside may be arranged in a circumference direction. Further, the sliding seals may be formed by applying a sheet-like material, or by applying and solidifying a liquid type on the top surface of the rotary disk and the bottom surface of the slide disk. The aerostatic pocket of the present invention is not limited to a type that is surrounded by the sliding seal noted above and may be a type that forms a recess on the top surface of the rotary disk or the bottom surface of the slide disk and be formed in an internal space of the recess. In this case also, a coating of solid lubricating film such as a diamond like carbon (DLC) is preferably formed entirely on the top surface of the rotary disk or the bottom surface of the slide disk or around the recess.

The roundness measuring apparatus of the present invention includes the rotary table described in any one of aspects mentioned above. In such an invention, an effect can be achieved as described for the rotary table according to the above described present invention.

According to the present invention, a roundness measuring apparatus and a rotary table can be provided that are capable of a high damping performance during measurement and reducing a sliding resistance at the time of a centering adjustment.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
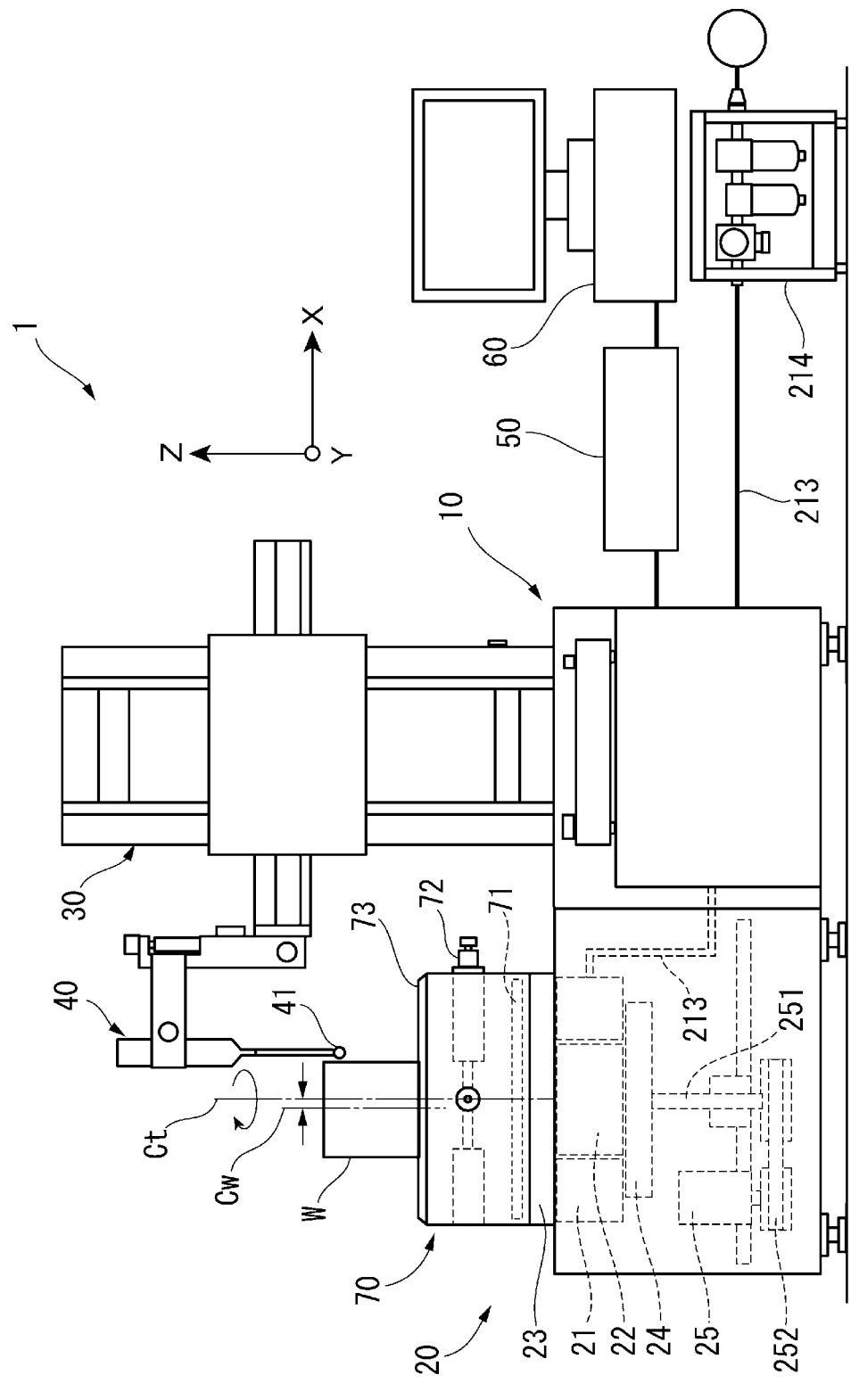
FIG. 1 is a front view of a roundness measuring apparatus according to an embodiment of the present invention.

Hereafter, an embodiment of the present invention is described with reference to the drawings. FIG. 1 illustrates a roundness measuring apparatus 1 according to the present invention. The roundness measuring apparatus 1 includes a rotary table 20 and a detection device displacement mechanism 30 on a top surface of an apparatus main body 10, and a contact detection device 40 is supported by and the detection device displacement mechanism 30. The rotary table 20, details of which are described hereafter, has a work piece W placed on a top surface and is capable of rotating around a vertical axis with respect to the apparatus main body 10.

The detection device displacement mechanism 30 includes a displacement mechanism displaceable in a direction of each axis (X axis, Y axis, and Z axis) (not shown in the drawings) and can displace the contact detection device 40 to a desired position in the respective axis direction of the apparatus main body 10. The contact detection device 40 includes a stylus 41 and a converter (not shown in the drawings) and can output a displacement of the stylus 41 as an electric signal. The contact detection device 40 is displaced by the detection device displacement mechanism 30 and by bringing the stylus 41 into contact with a surface of the work piece W that rotates together with the rotary table 20, a profile shape of the work piece W can be output as a signal by the contact detection device 40.

The roundness measuring apparatus 1 is connected to a control device 50 and an operation device 60. The operation device 60 is configured using a personal computer or the like, and performs various operations with respect to the control device 50 and the roundness measuring apparatus 1, and can display measurement results and the like. The control device 50 can control operations of various components of the roundness measuring apparatus 1 that is necessary for detecting an outline shape of a circumferential surface of the work piece W and the roundness by incorporating control software to measure the outline shape such as the roundness of the work piece W, and by activating the software by the operation device 60.

Figure 2:
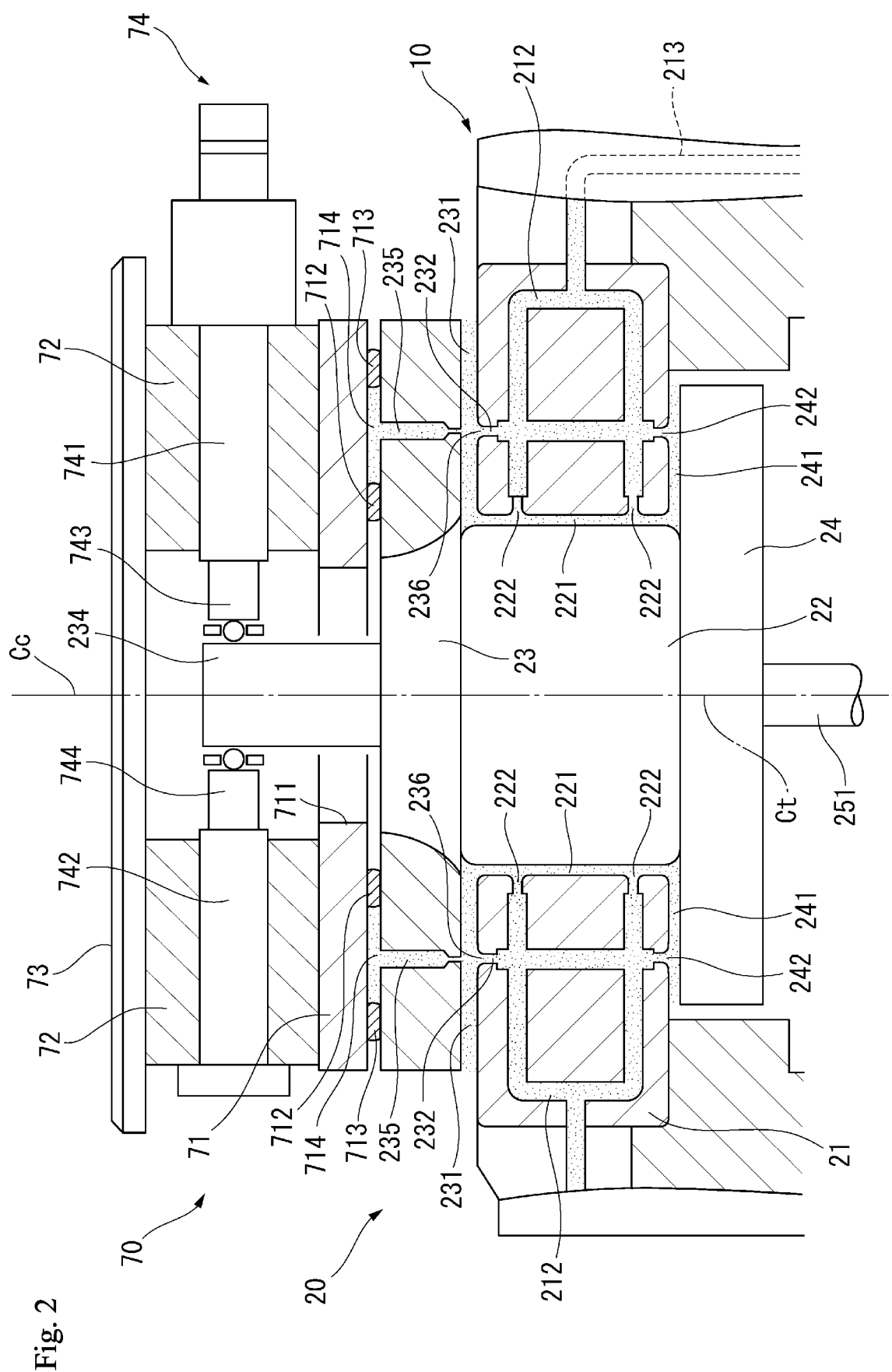
FIG. 2 is a cross-sectional view of a rotary table according to the embodiment.

FIG. 2 illustrates the rotary table 20 according to the present invention. The rotary table 20 includes an annular stator 21 (bearing member or bearing) that is arranged along the top surface of the apparatus main body 10, and a rotor 22 inserted through the stator 21. A rotary disk 23 is connected to a top end of the rotor 22 and a preload disk 24 is connected to a bottom end of the rotor 22.

A slight gap is formed between an inner circumferential surface of the stator 21 and an outer circumferential surface of the rotor 22, between a top surface of the stator 21 and a bottom surface of the rotary disk 23, and between a bottom surface of the stator 21 and a top surface of the preload disk 24 respectively. On the inner circumferential surface, the top surface, and the bottom surface of the stator 21 that face these gaps, air nozzles 222, 232, and 242 are formed that communicate through each gap. The air nozzles 222, 232, and 242 are annularly arrayed in plural and are installed at a predetermined interval in a respective circumference direction. The air nozzles 222, 232, and 242 are communicated to internal flow paths 212 of the stator 21 respectively. A pressurized air supply device 214 (see FIG. 1) is connected to the internal flow paths 212 via a supply line 213. The pressurized air is supplied to the air nozzles 222, 232, and 242 from the pressurized air supply device 214 or the internal flow paths 212, thereby static pressure air films 221, 231, and 241 are formed in gaps between the stator 21 and the rotor 22, and the rotary disk 23 and preload disk 24.

In the stator 21, an aerostatic bearing in a radial direction is formed, by the static pressure air film 221, between the inner circumferential surface of the stator 21 and the outer circumferential surface of the rotor 22. On the other hand, an aerostatic bearing in a thrust direction is formed, by the static pressure air film 231, between the top surface of the stator 21 and the bottom surface of the rotary disk 23. Further, an aerostatic bearing in the thrust direction is formed, by the static pressure air film 241, between the bottom surface of the stator 21 and the top surface of the preload disk 24, for preloading the air film of the static pressure air film 231.

Therefore, the rotor 22, the rotary disk 23, and the preload disk 24 (collectively referred to as a rotary table main body) are rotatably supported in a non-contact state with respect to the stator 21 via the respective static pressure air films 221, 231, and 241. The pressurized air supplied to the air nozzles 222, 232, and 242 from the pressurized air supply device 214 and the internal flow paths 212 are appropriately adjusted to a predetermined pressure and flow necessary for the static pressure air films 221, 231, and 241 that are formed between each gap to serve as the aerostatic bearing.

A drive shaft 251 is connected to a bottom surface side of the preload disk 24 and a drive motor 25 is connected to the drive shaft 251 via a belt transmission mechanism 252 (see FIG. 1). Accordingly, the preload disk 24 or the rotary disk 23 can be rotated at a desired rotation speed or to a desired angle position by rotating the drive motor 25. At this time, the preload disk 24 and the rotary disk 23 are rotatably supported in the non-contact state with respect to the stator 21 via the respective static pressure air films 221, 231, and 241, and mutual sliding resistance is kept to a minimum and a smooth rotation can be achieved.

In the present embodiment, according to the configuration mentioned above, a basic function is achieved of the rotary table 20 that places the work piece W and rotates. Furthermore, in the rotary table 20 of the present embodiment, in addition to the basic function, a centering table 70 is installed to minimize an amount of centering offset (centering adjustment) between a rotation axis line Ct of the rotary table 20 and a rotation axis line Cw of the work piece W (see FIG. 1).

The centering table 70 is described with reference to FIGS. 2 to 4. The centering table 70 includes a slide disk 71 that can slide on a top surface of the rotary disk 23. A support ring 72 is arranged on a top surface of the slide disk 71 and a placement disk 73 on which the work piece W is placed is installed on a top surface of the support ring 72. An opening 711 is formed at a center of the slide disk 71. A rectangular columnar basic stud 234 that extends along the rotation axis line Ct is arranged on the top surface of the rotary disk 23. The basic stud 234 is exposed to the top surface side of the slide disk 71 through the opening 711.

Figure 3:
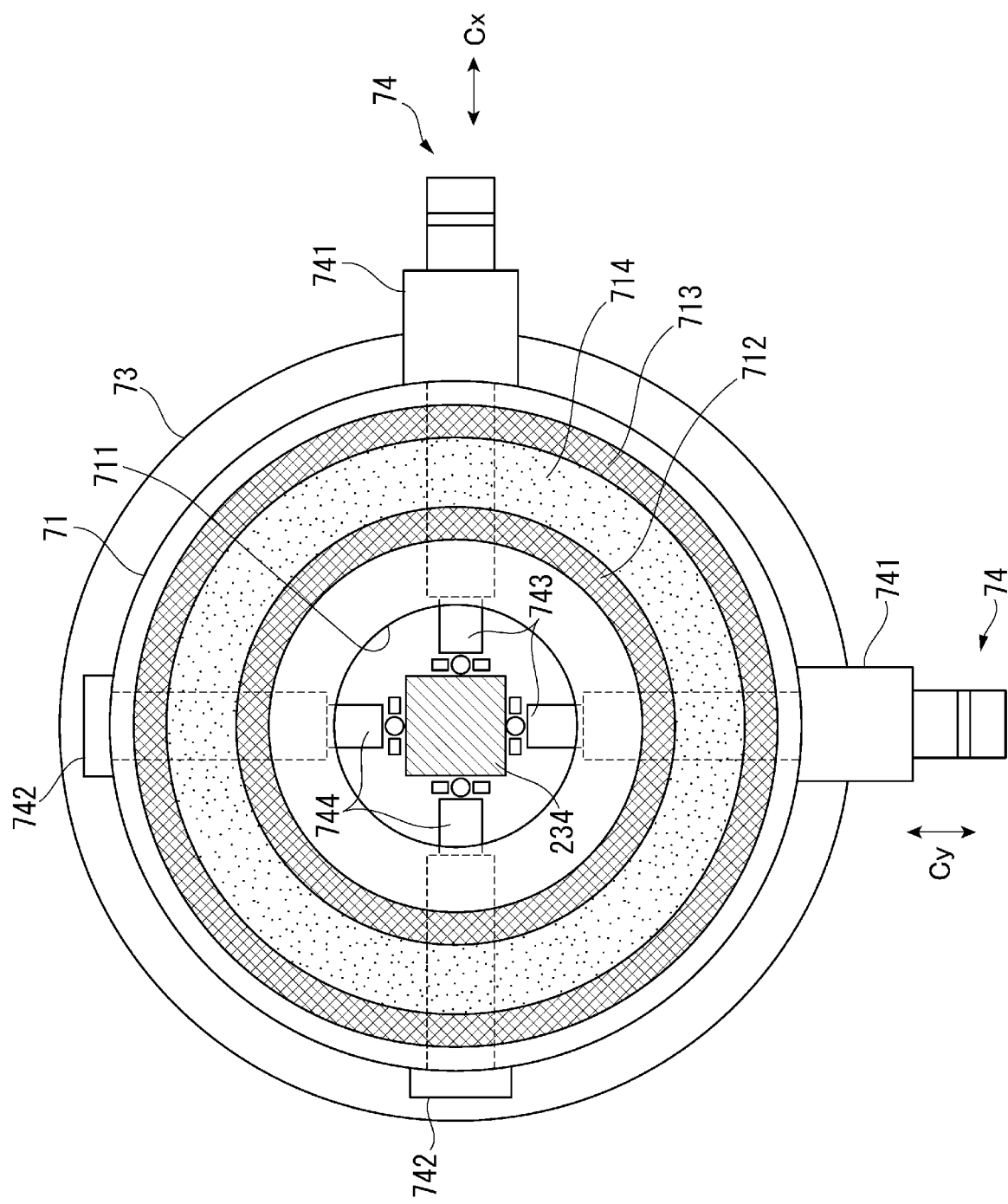
FIG. 3 is a horizontal cross-sectional view of a bottom surface side of a slide disk according to the embodiment.

The support ring 72 is provided with two sets of position adjustment mechanisms (position adjustment brackets) 74 in an orthogonal direction (Cx direction and Cy direction in FIG. 3). Each set of the position adjustment mechanisms 74 includes an adjuster 741 using a motor-driven micrometer head and a biasing portion 742 with a built-in coil spring. Tip portions 743 and 744 of the adjuster 741 and the biasing portion 742 are in contact with each side surface of the basic stud 234 via a rolling boll rotatably held by a retainer. The adjuster 741 can advance and retreat the tip portion 743 by driving the built-in motor or by rotating a knob manually. The biasing portion 742 is in a state where the tip portion 744 is pressed against the basic stud 234 via the built-in coil spring and, the basic stud 234 and the tip portion 743 of the adjuster 741 are constantly in contact on the opposite side. Therefore, in the position adjustment mechanism 74, by performing an operation to advance and retreat the tip portion 743 of the adjuster 741, the rotary disk 23 and the slide disk 71 are capable of relative displacement in Cx direction or Cy direction.

Such a position adjustment mechanism 74 is installed in two directions that are orthogonal (Cx direction and Cy direction), and therefore, the slide disk 71 can displace to a desired position along the top surface of the rotary disk 23. In other words, with the two sets of the position adjustment mechanisms 74, a rotation axis line Cc of the centering table 70 (see FIG. 2) and the rotation axis line Ct of the rotary table 20 can be aligned (offset is minimized). Therefore, even when the rotation axis line Cw of the work piece W which is placed on the placement disk 73 (see FIG. 1) is offset by the amount of centering offset with respect to the rotation axis line Ct of the rotary table 20, the rotation axis line Cw of the work piece W and the rotation axis line Ct of the rotary table 20 can be aligned (offset is minimized) by displacing the rotation axis line Cc of the centering table 70 by a calibration amount of centering offset that cancels out the amount of centering offset (centering offset adjustment).

A bottom surface of the slide disk 71 and the top surface of the rotary disk 23 slide during the centering offset adjustment noted above. In order to minimize the sliding resistance at this time, an aerostatic pocket 714 is formed between the respective surfaces to receive the load by the internal air pressure. On the bottom surface of the slide disk 71, two annular sliding seals 712 and 713 in different sizes (big and small) are applied in a concentric circle shape in two layers internally and externally. The sliding seals 712 and 713 are formed respectively by punching out a low friction material sheet having elasticity such as fluorine resin. The sliding seals 712 and 713 are fixated by an adhesive or the like to the bottom surface of the slide disk 71 and the bottom surface thereof is closely attached to the top surface of the rotary disk 23. With these sliding seals 712 and 713, a gap, corresponding to a thickness of the sliding seals 712 and 713, is formed between the bottom surface of the slide disk 71 and the top surface of the rotary disk 23 and the aerostatic pocket 714 is formed in an annular shape between the two sliding seals 712 and 713.

When the aerostatic pocket 714 is air-tightly sealed against outside by the sliding seals 712 and 713 and pressurized air is filled inside, a portion of the weight of the work piece W which is placed on the slide disk 71 or the placement disk 73, and the placement disk 73 can be received with the air pressure inside the aerostatic pocket 714 and enables a smooth slide by reducing the sliding resistance between the bottom surface of the slide disk 71 and the top surface of the rotary disk 23. Since the sliding seals 712 and 713 have low friction properties, even when the bottom surface thereof is closely attached to the top surface of the rotary disk 23, significant sliding resistance is not generated.

In the rotary disk 23, a communication hole (communication aperture) 235, that inserts through the top and bottom surfaces, is formed on an extension line of the air nozzle 232 of the stator 21 in a state where the rotation axis lines Ct and Cc are aligned. The static pressure air film 231 on the bottom surface of the rotary disk 23 and the aerostatic pocket 714 between the bottom surface of the slide disk 71 and the top surface of the rotary disk 23 are communicated by the communication hole 235, and the air pressure inside the static pressure air film 231 is also introduced to air inside the aerostatic pocket 714. As described above, the aerostatic pocket 714 is air-tightly sealed by the sliding seals 712 and 713, so air itself inside the static pressure air film 231 does not significantly flow into the aerostatic pocket 714 via the communication hole 235.

Figure 4:
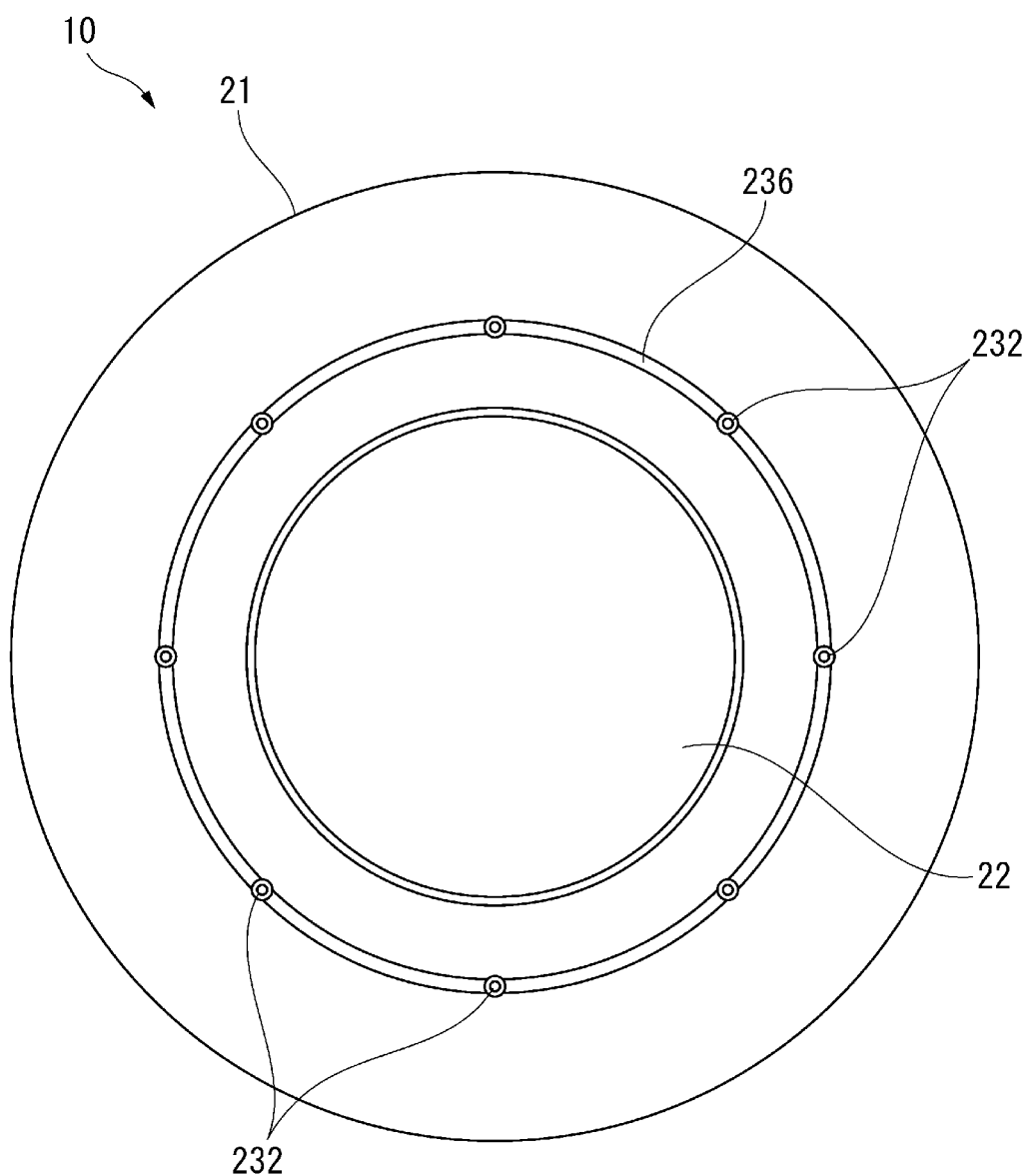
FIG. 4 is a horizontal cross-sectional view of a top surface side of a stator according to the embodiment.

On the top surface of the stator 21, an annular groove 236 is formed as shown in FIG. 4. The annular groove 236 is shaped in a semicircular cross section and is formed on the top surface of the stator 21 and is in an annular shape that travels various openings of the annularly arrayed air nozzle 232. Each air nozzle 232 is communicated by the annular groove 236 and the communication hole 235 on the bottom surface of the rotary disk 23 is communicated to the annular groove 236 respectively. Specifically, the communication hole 235 is aligned on the same axis line as the air nozzle 232 when positioned at a predetermined angle around the rotation axis lines Ct and Cc, however, is mutually offset at a position with other angles. However, the pressure from the pressurized air from the air nozzle 232 is smoothly introduced to the communication hole 235 and is further introduced to the aerostatic pocket 714, by having the constant communication of the communication hole 235 with respect to the annular groove 236 that is communicated to the air nozzle 232.

In this way, when sliding while the bottom surface of the slide disk 71 and the top surface of the rotary disk 23 are in contact, the pressure inside the annular groove 236 of the rotary disk 23 is introduced to the aerostatic pocket 714 via the communication hole 235 and the load is received by the internal pressure of the aerostatic pocket 714, and thereby the sliding resistance between the bottom surface of the slide disk 71 and the top surface of the rotary disk 23 is reduced and the smooth slide can be achieved. Accordingly, the bottom surface of the slide disk 71 is supported mutually, with respect to the top surface of the rotary disk 23, by a contact region and a non-contact region due to the air pressure of the aerostatic pocket 714, and a smooth displacement is achieved by adjusting the mutual sliding resistance so as to be in a size appropriate for reducing external disturbances.

Figure 5:
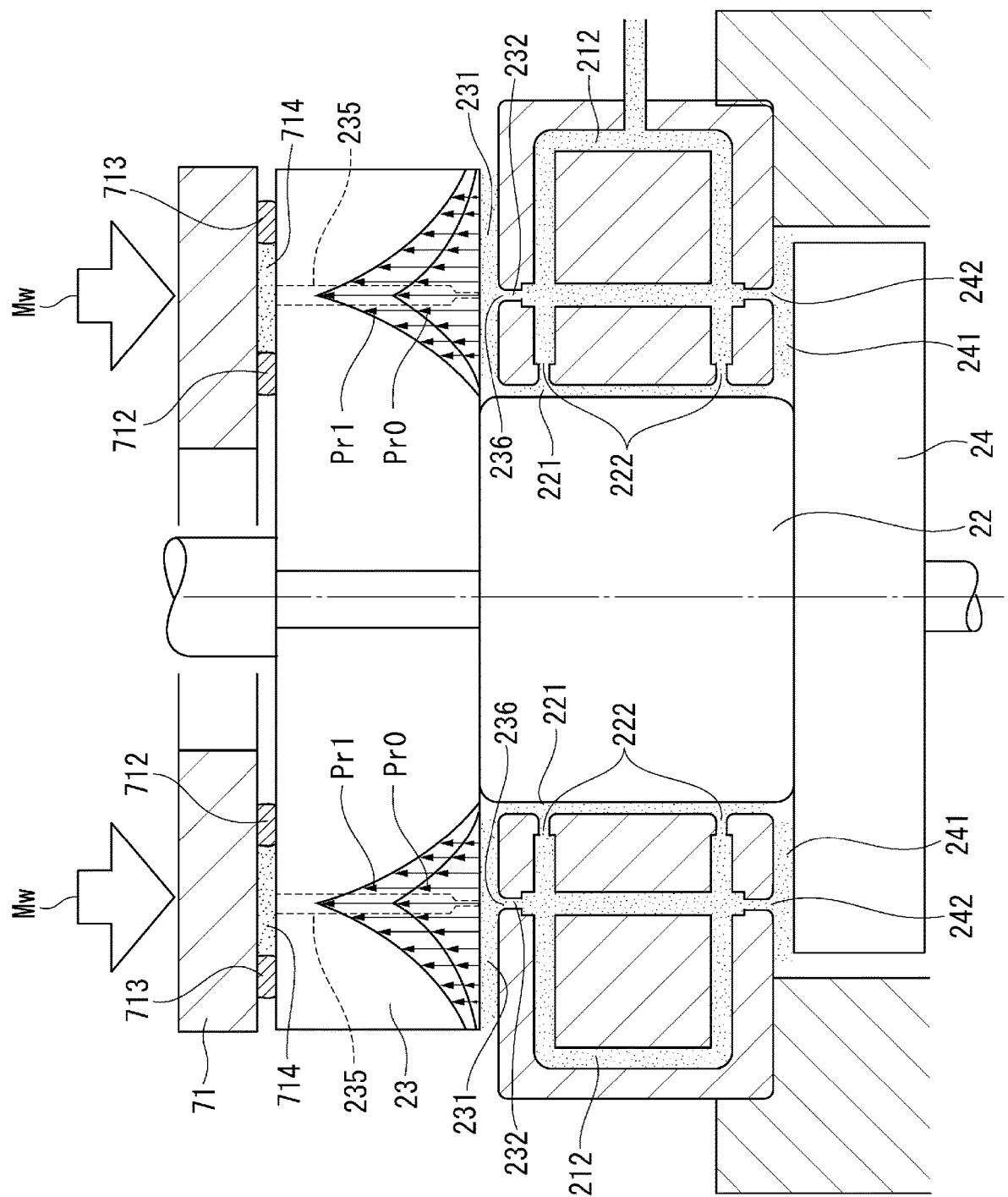
FIG. 5 illustrates a schematic view of a pressure distribution of a static pressure air film according to the embodiment.

With reference to FIG. 5, functions of the static pressure air films 221, 231, and 241, and the aerostatic pocket 714 are described according to the present embodiment. When the roundness measuring apparatus 1 is started, the pressurized air from the pressurized air supply device 214 (see FIG. 1) is supplied to the internal flow path 212 of the stator 21 via the supply line 213. The pressurized air is supplied to the air nozzles 222, 232, and 242 from the internal flow path 212, and thereby the static pressure air films 221, 231, and 241 are formed in gaps between stator 21 and rotor 22, and rotary disk 23 and preload disk 24 noted above. The pressurized air that has formed the static pressure air films 221, 231, and 241 gradually flows to an outer circumferential side of the rotary disk 23 and the preload disk 24 and is released to the atmosphere.

By the static pressure air film 221 (between the inner circumferential surface of the stator 21 and outer circumferential surface of the rotor 22), the aerostatic bearing in the radial direction is formed to restrain the displacement in the radial direction of the rotation axis line Ct of the rotary disk 23. By the static pressure air film 231 (between the top surface of the stator 21 and the bottom surface of the rotary disk 23), the aerostatic bearing in the thrust direction is formed to restrain the displacement in the rotation axis line Ct of the rotary disk 23 and support the load of the work piece W. By the static pressure air film 241 (between the bottom surface of the stator 21 and the top surface of the preload disk 24), the aerostatic bearing in the thrust direction is formed to provide a preload to the static pressure air film 231.

Of these, the pressurized air that passes through the static pressure air film 231 is reduced, when passing the air nozzle 232, to the pressure that keeps balance with the applied load of the work piece W. In other words, in an unloaded state, the air pressure supplied from the air nozzle 232 is as in $Pr0$ as illustrated in FIG. 5. The pressure $Pr0$ becomes maximum near the annular groove 23 including the air nozzle 232 that is supplied by the static pressure air film 231 and is gradually decreased as it reaches around the static pressure air film 231 distant from the air nozzle 232. When the load of the work piece W (weight Mw) is applied, in the static pressure air film 231, the weight Mw of the work piece W is loaded to the static pressure air film 231 and the air pressure from the air nozzle 232 is increased to $Pr1$. The pressure $Pr1$ also becomes maximum near the annular groove 236 and the air nozzle 232, similar to the pressure $Pr0$, and is gradually decreased as it reaches around the static pressure air film 231.

In this way, when the work piece W having a significant weight is mounted and the load to the static pressure air film 231 is increased, in order to support the load, the pressure of the static pressure air film 231 is increased. On the other hand, when the load to the static pressure air film 231 is decreased, the pressure of the static pressure air film 231 is dropped. In this way, the static pressure air film 231, that is a thrust aerostatic bearing which receives the load of the work piece W, is automatically adjusted so as to maintain the balance and the weight of the work piece W. A bearing effective area by the static pressure air film 231 is defined as Ae and the product between a difference of pressure $\Delta P = (Pr1-Pr0)$ before and after placing the work piece W and the area Ae is equal to the weight Mw of the work piece W. Thus, $Mw = Ae \times \Delta P$ is established.

The aerostatic pocket 714 is communicated via the communication hole 235 with the annular groove 236 and the air nozzle 232 that becomes a maximum pressure region inside the static pressure air film 231. The pressure of the air film of the aerostatic pocket 714 is adjusted by the same pressure as the annular groove 236 and the static pressure air film 231.

In the aerostatic pocket 714, when the load of the work piece W is only increased by weight Mw from the unloaded state, the pressure inside the aerostatic pocket 714 is also increased. When a pressure receiving area S of the aerostatic pocket 714 and the difference of pressure inside the aerostatic pocket 714 $\Delta P (=Pr1-Pr0)$ are defined, a force $\Delta F$ that is the air pressure of aerostatic pocket 714 bearing the weight Mw of the work piece W is established as $\Delta F = S \times \Delta P = S \times (Pr1-Pr0)$. In this example, in a state where the weight Mw of the work piece W is smaller than the force $\Delta F$ that is borne by the air pressure of aerostatic pocket 714 ($Mw < \Delta F$), the centering table 70 may be completely floated from the rotary disk 23 and may become unstable, and therefore, relation of $\Delta F < Mw$ must be at least maintained. In other words, $S \times (Pr1-Pr0) < Ae \times (Pr1-Pr0)$ is introduced from $\Delta P = (Pr1-Pr0) = \Delta F$ and therefore, a design guide of the pressure receiving area S of the aerostatic pocket 714 is $S < Ae$.

The following effects are achieved according to the present embodiment with the above-noted configuration. In the present embodiment, the basic configuration of the rotary table 20 is obtained by the rotary disk 23 and the bearing member (stator 21). In the rotary table 20, the rotary disk 23 is supported in the non-contact state by the static pressure air films 221, 231, and 241 and the smooth rotation can be obtained as the rotary table 20. The centering table 70 is configured by the slide disk 71 that is provided on the top surface of the rotary disk 23, the position adjustment mechanism 74, and the placement disk 73. In the centering table 70, the weight of the work piece W placed on the slide disk 71 or the placement disk 73, and the placement disk 73 is supported by a non-contact region by the air pressure inside the aerostatic pocket 714 and the mutual contact region between the bottom surface of the slide disk 71 and the top surface of the rotary disk 23, and the mutual sliding resistance is set to be an appropriate size for external disturbance suppression. When performing the centering adjustment to displace by the position adjustment mechanism 74 with respect to rotary disk 23, a smooth displacement is possible.

In the present embodiment, the sliding resistance between the slide disk 71 and rotary disk 23 is set to be an appropriate size for external disturbance suppression, and therefore, at the time of measurement, a damping performance of vibration can be obtained and external disturbance can be reduced between the slide disk 71 and the rotary disk 23. At this time, the air pressure inside the aerostatic pocket 714 can be obtained, via the communication hole 235, from the annularly arrayed air nozzles 232 that form the static pressure air film 231 and the annular groove 236 that connects the air nozzles 232, and can have a simple apparatus configuration without requiring a separate air pipe and the like. In the present embodiment, the pressurized air introduced to the aerostatic pocket 714 is maintained internally by being surrounded by the sliding seal, and therefore, there is no leak of pressurized air or the leak is suppressed to an extremely small amount, so the amount of consumed air as the rotary table 20 can be reduced entirely.

The present invention is not limited to the embodiment described above, and includes modifications within a scope capable of achieving the advantages of the present invention. In the embodiment described above, the two sliding seals 712 and 713 in different sizes (big and small) are installed in two layers internally and externally, and the annular region therebetween was configured as the aerostatic pocket 714. However, the sliding seal may be formed in three layers or more and an aerostatic pocket may be formed between each layer. In addition, the sliding seals 712 and 713 are not limited to the concentric shape with the slide disk 71 and a sliding seal in a small circular shape that forms the aerostatic pocket 714 internally may be arrayed in plurality in a circumferential direction around the center of the slide disk 71. In the embodiment described above, the sliding seals 712 and 713 are formed by the low friction material sheet that has elasticity such as fluorine resin and applied to the bottom surface of the slide disk 71 with adhesive, however, other methods may be used to fixate the bottom surface of the slide disk 71. Further, the sliding seals 712 and 713 may be formed by not applying a separate sheet-like material, but by applying and solidifying a liquid type to the bottom surface of the slide disk 71. In the embodiment described above, the sliding seals 712 and 713 are installed to the bottom surface of the slide disk 71 and the aerostatic pocket 714 is formed therebetween. However, the sliding seals 712 and 713 may be installed on the top surface of the rotary disk 23 and the aerostatic pocket 714 may be formed therebetween.

Figure 6:
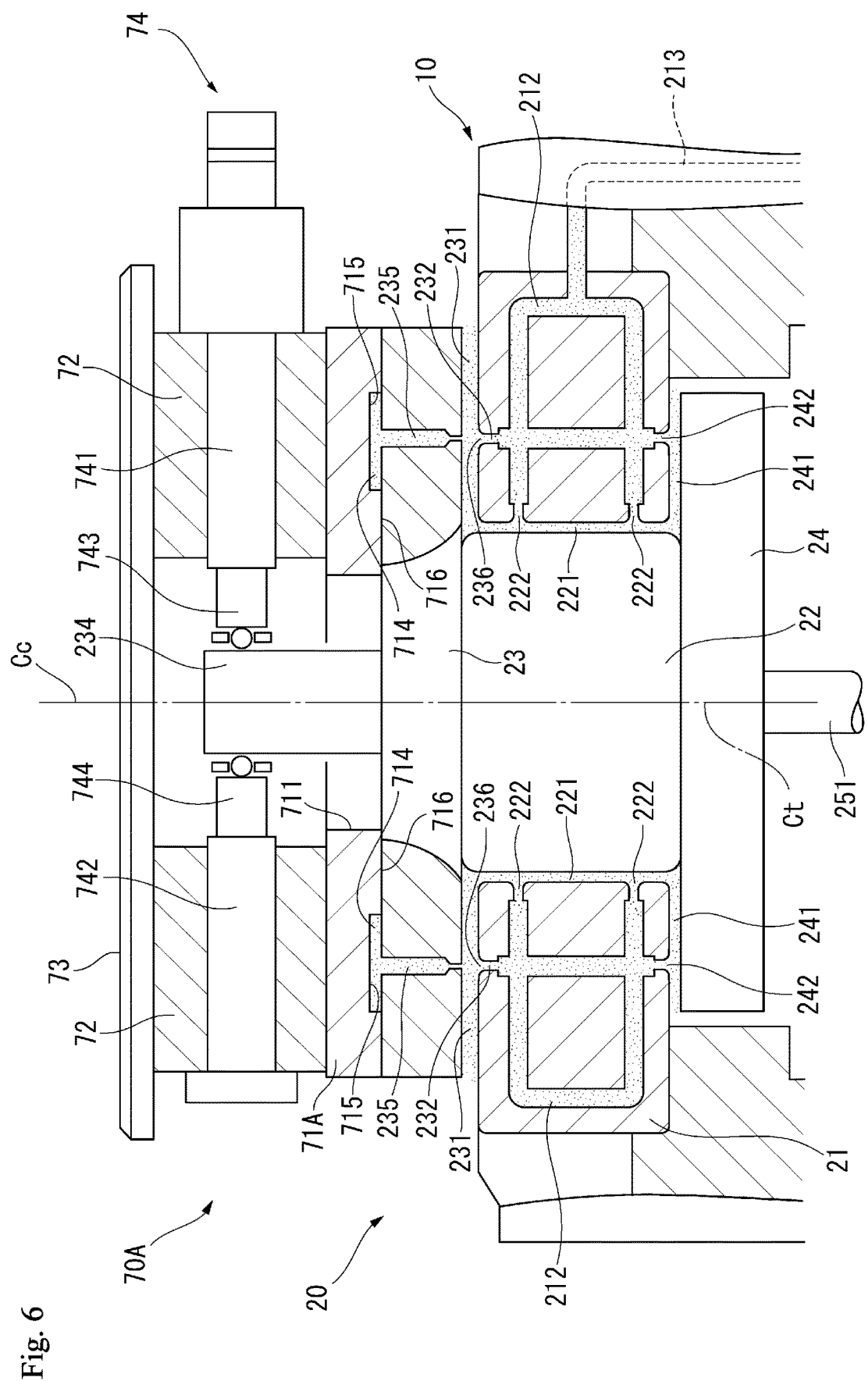
FIG. 6 is a cross-sectional view of a rotary table according to another embodiment.

In the embodiment described above, the sliding seals 713 and 713 are installed on the bottom surface of the slide disk 71 and the aerostatic pocket 14 was formed therebetween. However, the aerostatic pocket 714 is not limited to be surrounded by the sliding seal noted above and instead a recess may be formed on the top surface of the rotary disk 23 or the bottom surface of the slide disk 71 and the aerostatic pocket 714 may be formed in the internal space of the recess. FIG. 6 illustrates a centering table 70A according to other embodiment of the present invention. The centering table 70A is similar to the embodiment described in FIG. 1 or FIG. 5, except for the slide disk 71 where the aerostatic pocket 714 is formed. Accordingly, duplication description is omitted and only those portions that are differentiated are described below.

In the embodiment described above, the sliding seals 712 and 713 are applied to the bottom surface of the slide disk 71 and the aerostatic pocket 714 is formed therebetween. However, in the present embodiment, an annular recess portion 714 is formed at a bottom surface of the slide disk 71A and the aerostatic pocket 714 is formed in the internal space. On the bottom surface of the slide disk 71A, a coating 716 of solid lubricating film such as a diamond like carbon (DLC) is formed around a recess 715 and the slide disk 71A is configured so as to minimize frictional resistance even when sliding with the top surface of the rotary disk 23. The coating 716 may also be formed not on the bottom surface of the slide disk 71A, but on the top surface of the rotary disk 23 or be omitted. Also, with the embodiment described in FIG. 6, the load can be supported in the non-contact state via the pressurized air introduced to the aerostatic pocket 714 that is formed between the bottom surface of the slide disk 71A and the top surface of the rotary disk 23, and a high damping performance can be enabled during measurement and sliding resistance can be reduced during the centering adjustment.

In the embodiment described above, the annular groove 236 is formed on the top surface of the stator 21 and communicated through a plurality of air nozzles 232. However, instead, an annular groove may be formed on the bottom surface of the rotary disk 23 and communicated through a plurality of communication holes 235. With such an annular groove of the rotary disk 23, the communication hole 235 or the air nozzle 232 is communicated through the respective annular grooves at all times. Thus, even in a case where the communication hole 235 and the air nozzle 232 are separated according to the angle of rotation, the pressure of the static pressure air film can be introduced stably into the aerostatic pocket. Further, the annular groove 236 is not limited to one of the top surface of the stator 21 and the bottom surface of the rotary disk 23 and may be formed on both surfaces. In a case where the opening of the communication hole 235 or the air nozzle 232 is expanded for example, the annular groove 236 may be omitted when transmission of air pressure between the communication hole 235 and the air nozzle 232 can be performed smoothly.

In the embodiment described above, the communication holes 235 that are formed to the rotary disk 23 are arranged in the annular shape having a similar or corresponding diameter with that of the plurality of air nozzles 232 annularly arrayed on the top surface of the stator 21. However, the communication hole 235 can introduce the pressure into the aerostatic pocket 714 when connected to the static pressure air film 231 between the bottom surface of the rotary disk 23 and the top surface of the stator 21, and the communication hole 235 and the air nozzle 232 are not necessarily arranged in the annular shape having the similar diameter. However, by arranging in the annular shape having the similar diameter, pressurized air that is supplied from the air nozzles 232 to the annular groove 236 and the static pressure air film 231 is communicated through the communication hole using a shortest path, and therefore the air pressure can be transmitted efficiently via the communication hole 235 into the aerostatic pocket 714.

The present invention can be used in a rotary table and a roundness measuring apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A rotary table comprising:
   a rotary disk that is rotatable around a vertical rotation axis;
   a stator assembly comprising a bearing that supports the rotary disk such that the rotary disk is freely rotatable;
   a slide disk that is slidable on a top surface of the rotary disk;
   a position adjustment bracket that displaces the slide disk along the top surface of the rotary disk;
   a placement disk supported by the slide disk;

a plurality of air nozzles arranged on a top surface of the bearing in an annular configuration concentric with the rotation axis, and forming a static pressure air film between the top surface of the bearing and a bottom surface of the rotary disk;

an aerostatic pocket positioned between the top surface of the rotary disk and a bottom surface of the slide disk; and a communication aperture formed in the rotary disk, the communication aperture configured to introduce pressure of the static pressure air film into the aerostatic pocket.

2. The rotary table according to claim 1, wherein the communication aperture comprises a plurality of communication apertures arranged in an annular configuration having a diameter corresponding to a diameter of the annular configuration of the plurality of air nozzles.

3. The rotary table according to claim 2, wherein the rotary table is provided with at least one of an annular groove formed on the top surface of the bearing in communication with the plurality of air nozzles, or an annular groove formed on the bottom surface of the slide disk and in communication with the plurality of communication apertures.

4. The rotary table according to claim 1, wherein the aerostatic pocket is surrounded by a sliding seal affixed to one of the top surface of the rotary disk or the bottom surface of the slide disk.

5. The rotary table according to claim 2, wherein the aerostatic pocket is surrounded by a sliding seal affixed to one of the top surface of the rotary disk or the bottom surface of the slide disk.

6. The rotary table according to claim 3, wherein the aerostatic pocket is surrounded by a sliding seal affixed to one of the top surface of the rotary disk or the bottom surface of the slide disk.

7. A roundness measuring apparatus comprising:
a rotary table comprising:
a rotary disk that is rotatable around a vertical rotation axis;
a stator assembly comprising a bearing that supports the rotary disk such that the rotary disk is freely rotatable;
a slide disk that is slidable on a top surface of the rotary disk;
a position adjustment bracket that displaces the slide disk along the top surface of the rotary disk;
a placement disk supported by the slide disk;
a plurality of air nozzles arranged on a top surface of the bearing in an annular configuration concentric with the rotation axis, and forming a static pressure air film between the top surface of the bearing and a bottom surface of the rotary disk;
an aerostatic pocket positioned between the top surface of the rotary disk and a bottom surface of the slide disk; and
a communication aperture formed in the rotary disk, the communication aperture configured to introduce pressure of the static pressure air film into the aerostatic pocket.

8. The roundness measuring apparatus according to claim 7, wherein the communication aperture comprises a plurality of communication apertures arranged in an annular configuration having a diameter corresponding to a diameter of the annular configuration of the plurality of air nozzles.

9. The roundness measuring apparatus according to claim 8, wherein the rotary table is provided with at least one of an annular groove formed on the top surface of the bearing in communication with the plurality of air nozzles, or an annular groove formed on the bottom surface of the slide disk and in communication with the plurality of communication apertures.

10. The roundness measuring apparatus according to claim 7, wherein the aerostatic pocket is surrounded by a sliding seal affixed to one of the top surface of the rotary disk or the bottom surface of the slide disk.

11. The roundness measuring apparatus according to claim 8, wherein the aerostatic pocket is surrounded by a sliding seal affixed to one of the top surface of the rotary disk or the bottom surface of the slide disk.

12. The roundness measuring apparatus according to claim 9, wherein the aerostatic pocket is surrounded by a sliding seal affixed to one of the top surface of the rotary disk or the bottom surface of the slide disk.

* * * * *